United States Patent [19]
Artbauer

[11] 3,777,045
[45] Dec. 4, 1973

[54] HIGH VOLTAGE SYSTEM, PARTICULARLY CABLE

[75] Inventor: Jan Artbauer, Langenhagen, Germany

[73] Assignee: Kabel-und Metallwerke Gutehoffnungshutte Aktiengesellschaft, Hannover, Germany

[22] Filed: May 30, 1972

[21] Appl. No.: 257,914

[30] Foreign Application Priority Data
June 2, 1971 Germany.................. P 21 27 274.2

[52] U.S. Cl.............. 174/28, 174/102 D, 333/84 R
[51] Int. Cl. ........................................... H01b 9/04
[58] Field of Search..................... 174/28, 29, 68 C, 174/102 D, 106 D; 333/31 A, 73 C, 81 A, 84, 96

[56] References Cited
UNITED STATES PATENTS
3,433,883   3/1969   Hahne................................ 174/28
2,870,792   1/1959   Penrose.......................... 174/102 D FOREIGN PATENTS OR APPLICATIONS
714,797    11/1941   Germany............................. 174/28
1,200,808   8/1970   Great Britain........................ 174/28

Primary Examiner—Bernard A. Gilheany
Assistant Examiner—A. T. Grimley
Attorney—Ralf H. Siegemund

[57] ABSTRACT

High voltage cable with a particular first, inner conductor of circular outer cross section and contour, and a second tubular conductor coaxially arranged to the first conductor, having inwardly projecting corrugation crests of convex contour, projecting inwardly towards the inner conductor. The radius of curvature of the convexity is selected so that the electric field strength immediately adjacent the corrugation crests of the second conductor is about similar to or somewhat smaller than the field strength immediately adjacent the first conductor.

4 Claims, 3 Drawing Figures

HIGH VOLTAGE SYSTEM, PARTICULARLY CABLE

BACKGROUND OF THE INVENTION

The present invention relates to a high voltage device having two or more electrically conductive components which are insulated from each other and have different voltage potential, exhibiting inhomogenic electric field strength in the region of highest electric field line concentration. More particularly, the invention relates to high voltage cable configuration of the coaxial variety.

The maximum permissible electrical field strength in a high voltage system is essentially determined by the break-through conditions of the insulation between these parts. Field strength generally and maximum field strength in particular is determined by the operating voltage, by the spacing of the components to which that voltage is applied, and by the surface contour of these components. Maximum electrical field strength in such a system is usually observed in or at the surface of a conductive part (electrodes) where facing another conductive part having a different potential and at closest distance therefrom. This rule holds true for homogenic as well as for most kinds of inhomogenic surface insulation. The rather localized maximum field strength is higher (for a particular distance between electrodes) for a smaller radius of curvature of the electrode surface where facing another electrode, under similar conditions of spacing.

It is usually desired, for economic reasons, to select a radius of curvature for electrodes that is as large as possible under the specific circumstances. For engineering reasons, it is usually necessary, or at least possible, to provide one electrode with a larger radius of curvature than the radius of the opposing electrode. This other electrode is then shaped so as to reduce its inherently higher local surface field strength in another way such as by enlarging its surface. A coaxial conductor system with a solid or tubular inner conductor and a tubular outer conductor or shield, defines two electrode surfaces. The inner conductor has cylindrical configuration with a relatively small radius of curvature. The outer conductor or shield faces the inner conductor with a concave electrode surface. Thus, the electric field strength has a very high value adjacent the inner conductor and drops off quite rapidly along a radius towards the outer conductor. Thus, the insulative characteristics of such a high voltage system is determined essentially by the insulation as effective in the immediate vicinity of the inner conductor. Consequently, that region is critically exposed to any tendency of insulation breakthrough.

DESCRIPTION OF THE INVENTION

It is an object of the present invention to provide specific rules and teachings for reducing the maximum field strength on the surface of electrodes, particularly of those which do exhibit higher field strength for reasons of a relatively small radius of curvature.

It is a specific object of the present invention to provide a high voltage cable system with an inner conductor and an outer conductor or shield, being coaxially disposed to the inner conductor, wherein the maximum field strength along the inner conductor is reduced so as to relieve the insulative vicinity of the inner conductor from exposure to an excessively high local electrical field.

In accordance with the preferred embodiment of the invention, it is suggested to increase the local surface field strength at the electrode which otherwise has lower field strength than the others. Optimum conditions are established when the maximum field strength of both (or all) electrodes are similar. Specifically, the outer conductor of a coaxial high voltage system is to be provided with inwardly directed convexities in the form of corrugation, so that the local field strength there along does not exceed the (theoretical) local field strength immediately adjacent the inner conductor for a (theoretical) smooth wall outer conductor having radius comparable with the average radial dimensions of the outer conductor which is actually being used.

The invention is based on the discovery that the local field strength at the electrode with the inherently highest field strength actually reduces upon attempting to increase the local field strength adjacent the other electrode. That this is true is in consonance with the relation between field strength and voltage.

$$U = -\int_{s=0}^{s=a} E \cdot ds,$$

wherein $U$ is the (constant) voltage between the electrodes, $E$ the field strength as function of distance $S$ along a field line with $ds$ being a differential line increment there along and taken from $S = 0$ on one electrode to $S = a$ defining a surface point on the oppositely located electrode. If $E$ is intentionally increased near the surface of one electrode, the local field strength at a point on the other electrode as "linked" to the first one by a field line, must decline, as the value of the integral is constant as long as $U$ is constant. Thus, the invention is to be seen in the intentional elimination of local field strength differences as resulting, for example, from differently curved electrodes, and that is carried out by intentionally increasing the local field strength on the electrode with the (initially) larger radius of curvature, such as by providing convexities in a concavely shaped electrode.

It will readily be understood that within the context of this invention, the terms "convex" and "concave" refer to surface configurations of conductors and electrodes respectively, as facing another conductor or electrode carrying a different voltage.

The intentional increase in local field strength can be accomplished in various ways. For example, the electrode having originally larger radius of curvature may obtain a smaller one, possibly on a localized basis. The electrode with lower local field strength may even have (initially) concave configuration and should, therefor, be changed as to its effective surface configuration, to obtain, possibly locally, a convex contour. It is reasonable, however, that this intentional increase of local field strength remains below the highest local field strength in the unmodified system wherever that occurs.

Turning to specifics, electrodes within the definition used here are the conductors of a coaxial conductor system with high internal gas pressure for purposes of insulation within a high voltage cable system. The inner surface of the outer conductor is inherently concave so that the field strength adjacent that concave surface is significantly lower than the field immediately adjacent the convex surface of the inner conductor. The intentional increase in the local field strength on the inside of the outer conductor is obtained here by providing convexities on the inner surface of the outer conductor in form of corrugation with smooth, inwardly directed corrugation crests. This convex profile may be established by inwardly protruding helical or annular ridges or even by axial ridges, whereby the ridge to ridge spacing should not be larger than the average radial distance between the conductors. The radius of curvature of the inwardly directed, convex corrugation crests should be substantially smaller than the radius of curvature of or on the inner conductor.

As the cable is to be flexible in many cases, the convex contour of the outer conductor is obtained through particular corrugation of the outer conductor. Both, annular and helical corrugation is available here to combine flexibility with field strength equalization in the cable.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic representation of electrodes, shown for purposes of explaining the basic aspects of the invention;

FIG. 2 illustrates a longitudinal section view into a high voltage cable constructed in accordance with the preferred embodiment of the invention; and FIG. 3 illustrates a longitudinal section view into a somewhat modified high voltage cable constructed also in accordance with the preferred embodiment of the invention.

DESCRIPTION OF THE DRAWINGS

Proceeding now to the detailed description of the drawings, I turn first to FIG. 1 which is representative as to the basic principles involved. The Figure shows specifically two electrodes 1 and 2. Electrode 1 is flat (radius of curvature about infinitely large), electrode 2 is a sphere of radius $r$. It is assumed that for reasons of engineering or because of system constraints, the radius $r$ cannot be made larger than half the distance $a$ between the electrodes, i.e., $r = a/2$.

The largest field strength within the system, thus established, occurs immediately adjacent sphere 2 where facing plate 1, and that field strength $E$ max can be stated as being $E$ max $= 2.68\ U/a$ with $U$ being the electric voltage potential difference between the electrodes. The field strength on electrode 2 can be decreased, so as to decrease the maximum field strength in the system, by changing the configuration of electrode 1. For example, electrode 1 can be given spherical configuration and of the same radius, as electrode 2 leaving distance $a$ as originally established. The maximum local field strength in the thus modified system is reduced to $E$ max $= 1.77\ U/a$. Therefor, the maximum local field strength in such a system is reduced by 34 percent as compared with the plate-sphere system illustrated. If the ratio $a/r$ can be increased, the relative improvement becomes even more pronounced.

Turning now to specific examples.

The local field strength on the inside of the outer conductor 4 is now increased so as to decrease the maximum local field strength on the inner conductor 3. This increase as to conductor 4 is accomplished by providing the otherwise cylindrical conductor 4 with rib-like profiles. These ribes are shown as inwardly projecting half-toroids. Instead, a helical rib in single or double helix configuration could be provided, or the inwardly projecting portions may even extend axially.

In particularizing the invention further, it is of advantage to provide the ridge-like profile in the interior of the inner tube by corrugating the outer tube helically or annularly (as shown). Corrugated tubes or conduits with corrugated envelopes are, of course, known per se, but not every corrugation is suitable for the inventive purpose. Thus, if the radius of curvature of the inwardly convex contour of the corrugation crest is too large, little is gained, and the maximum field strength on the inner conductor is not or hardly reduced from the prevailing value if the outer conductor is an uncorrugated tube (see formula above). If the radius of curvature ($r$) is too small, there may be no improvement, but a reversal of the situation. The rule underlying the invention requires that the effective convexity on the conductor with otherwise lower local field strength, must not result in a higher field strength than on the inner conductor for an uncorrugated outer tube as per formula above.

In order to optimize the cross section of the conductor system, the corrugation profile must not be selected primarily under consideration of mechanical or material technological aspects. Rather, the radius $r$ of curvature of the inwardly directed corrugation convexity, particularly near the crest line, must remain in a range that is determined by the diameter of the inner and of the (average or unmodified) outer conductor. The "wavelength" 1 of the corrugation profile in axial direction has direct bearing on the situation.

In the preferred form, the corrugation of the outer conductor is selected so that the electric field strength along a corrugation crest is as near to the electric field strength along the inner conductor as is compatible with other requirements imposed on the outer conductor by the manufacturing process, installation and service demands. That, in turn, is obtained when the radius of curvature of the corrugation is substantially smaller than the radius of the inner conductor, and if the corrugation wavelength, e.g. in axial direction and the medium distance between inner and outer conductor, have comparable lengths. If the wave length is too large, the maximum field strength will vary axially so as to obviate the advantage of the corrugation; if the wavelength is too small, the effect aimed at will be reduced.

Figure 1:
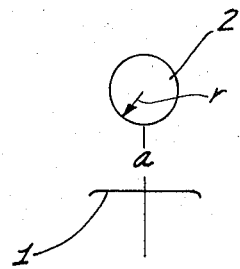
Figure 3:
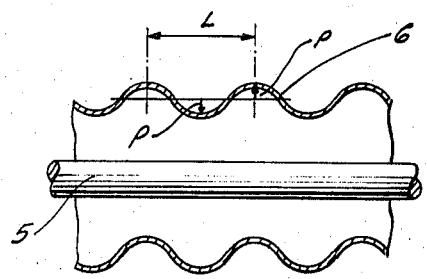
Figure 2:
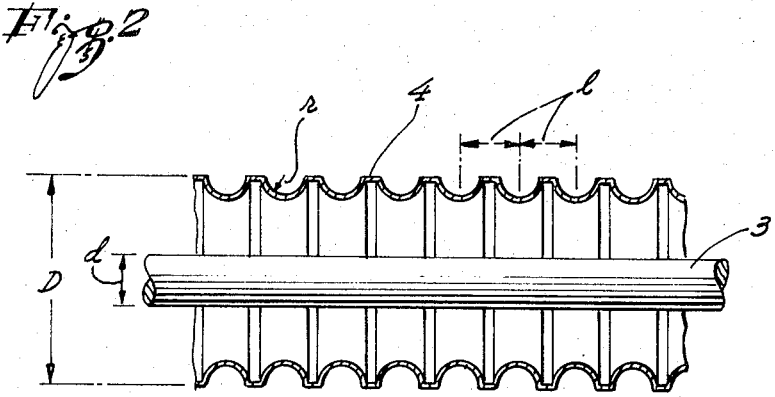
FIG. 2 illustrates two coaxially positioned tubes, 3 and 4, to be used as coaxial conductors or as encased single conductor, shielded conductors or the like for use in high voltage cables or in a high voltage bus system or the like. In either case, the conductors have basically tubular-coaxial configuration, and pressurized gas fills the space between them for improving insulation. Suitable spacers (not shown) may support tube 4 on tube 3. The voltage distribution between two coaxial smooth-walled tubes is given by a logarithmic function, and the maximum field strength on the inner conductor would be $2\ U/d \log_e D/d$.

Turning to details of FIG. 3, there is shown an inner conductor 5, and an outer conductor 6 is provided coaxially thereto. The space in-between the conductors is presumed to be pressurized for improving the insulative property of such a high voltage cable. The outer conductor 6 is provided with a helical corrugation. The corrugation is particularly contoured so that field strength on the outer conductor 6, particularly along the apex region of the inwardly projecting corrugation convexity, is increased to a value that is still below the local field strength on inner conductor 5 for a smooth wall outer conductor configuration.

The invention is not limited to the embodiments described above but all changes and mofidications thereof not constituting departures from the spirit and scope of the invention are intended to be included.

I claim:

1. High voltage cable with a particular first conductor of circular outer cross section and contour, and a second, tubular conductor coaxially arranged to the first conductor, the improvement comprising:

inwardly projecting corrugation crests in the second conductor, having convex contour in a cross section plane, extending towards the tubular interior and having radius of curvature of its convex contour which is substantially smaller than the radius of the inner conductor, the field strength at said corrugation crest and at said inner conductor being lower than $2\ U/d\ \log_e\ D/d$ where $d$ is the diameter of the first conductor, D is the average, mean or equivalent diameter of the outer tube, and $U$ being the voltage between the conductors, so that the electric field strength immediately adjacent the corrugation crests of the second conductor is lower than the field strength immediately adjacent the first conductor, but higher than the field strength immediately adjacent a concave-cylindrical surface for an equivalent outer uncorrugated tube having radius equal to the average or mean radius of the corrugated second conductor.

2. High voltage cable as in claim 1, wherein the second conductor has annular or helical configuration.

3. Cable as in claim 1, wherein the inwardly directed corrugation crests are spaced-apart axially and separated by cylindrical wall portions of the tube.

4. Cable as in claim 1, wherein the corrugation is defined by a wave pattern in axial cross section.

* * * * *